United States Patent
Mankame et al.

(10) Patent No.: US 9,688,009 B2
(45) Date of Patent: Jun. 27, 2017

(54) CELLULAR MATERIALS BASED MOLDS WITH LOWER CYCLE TIME

(71) Applicant: GM GLOBAL TECHNOLOGY OPERATIONS LLC, Detroit, MI (US)

(72) Inventors: Nilesh D. Mankame, Ann Arbor, MI (US); Julien P. Mourou, Bloomfield Hills, MI (US); James E. Osbourn, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 399 days.

(21) Appl. No.: 14/497,081

(22) Filed: Sep. 25, 2014

(65) Prior Publication Data

US 2016/0089825 A1    Mar. 31, 2016

(51) Int. Cl.
*B29C 45/73*    (2006.01)
*B29L 31/30*    (2006.01)

(52) U.S. Cl.
CPC ...... *B29C 45/7312* (2013.01); *B29K 2905/00* (2013.01); *B29L 2031/30* (2013.01)

(58) Field of Classification Search
CPC .................. B29C 45/7312; B29C 45/7331
See application file for complete search history.

(56) References Cited

U.S. PATENT DOCUMENTS

| | | | |
|---|---|---|---|
| 5,775,402 A * | 7/1998 | Sachs | B22C 9/065 164/4.1 |
| 2003/0137070 A1* | 7/2003 | Hund | B29C 44/3415 264/41 |
| 2004/0099402 A1* | 5/2004 | Schwellenbach | B22D 11/059 164/418 |

* cited by examiner

*Primary Examiner* — Ryan Ochylski
(74) *Attorney, Agent, or Firm* — John A. Miller; Miller IP Group, PLC

(57) ABSTRACT

A mold comprising a scaffolding support structure including a base member, a top member and side members defining an enclosure. The scaffolding structure further includes a plurality of interconnected and elongated support members interspersed within the enclosure between the base member and the top member so as to define open space within the enclosure for ease of heating and cooling fluid flow, and a plurality of flow partitions within the enclosure. An intermediate layer is formed on the top member and a working surface layer is formed on the intermediate layer.

15 Claims, 3 Drawing Sheets

CELLULAR MATERIALS BASED MOLDS WITH LOWER CYCLE TIME

BACKGROUND OF THE INVENTION

Field of the Invention

This invention relates generally to a mold for molding a part and, more particularly, to a mold for molding a thermoplastic part that includes a scaffolding structure having a plurality of support members defining open space for heating and cooling fluid flow.

Discussion of the Related Art

Injection molding of thermoplastic parts, for example, vehicle trim panels, is well established process in the industry. Molds and dies for injection molded parts are typically a solid machined piece of metal that includes a die cavity in which the part is formed. A typical injection molding cycle for a single run of one or more parts will include closing the mold, filling the mold with a thermoplastic material, such as pellets, heating the mold to the desired temperature, holding the pellets in the mold for some period of time so that the pellets melt and form the part, cooling the mold to solidify the part, and then ejecting the part from the mold.

Typically, heating the mold and cooling the mold are the longest parts of the cycle time, where cooling the mold is the most significant. To provide heating and cooling, the mold is typically drilled with channels in which a heating and cooling fluid, such as water, flows to heat the mold mass and cool the mold mass at the desired times during the injection molding cycle. Because a relatively large mass of metal needs to be heated and cooled to provide a uniform temperature distribution across the mold to effectively produce the part, the length of time to provide the heating and cooling for such a large mass is significant compared with how long it actually takes to form the part. The cycle time and thus system cost can thus be reduced by reducing the heating and cooling time of the molding cycle.

SUMMARY OF THE INVENTION

The present disclosure describes a mold comprising a scaffolding support structure including a base member, a top member and side members defining an enclosure. The scaffolding structure further includes a plurality of support members interspersed within the enclosure between the base member and the top member so as to define open space within the enclosure for ease of heating and cooling fluid flow, and a plurality of flow partitions within the enclosure. An intermediate layer is formed on the top member and a working surface layer is formed on the intermediate layer.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an injection mold including scaffolding is merely exemplary in nature, and is in no way intended to limit the invention or its applications or uses. For example, the mold described herein has particular application for molding a vehicle part. However, as will be understood by those skilled in the art, the mold may have application for other parts.

Figure 1:
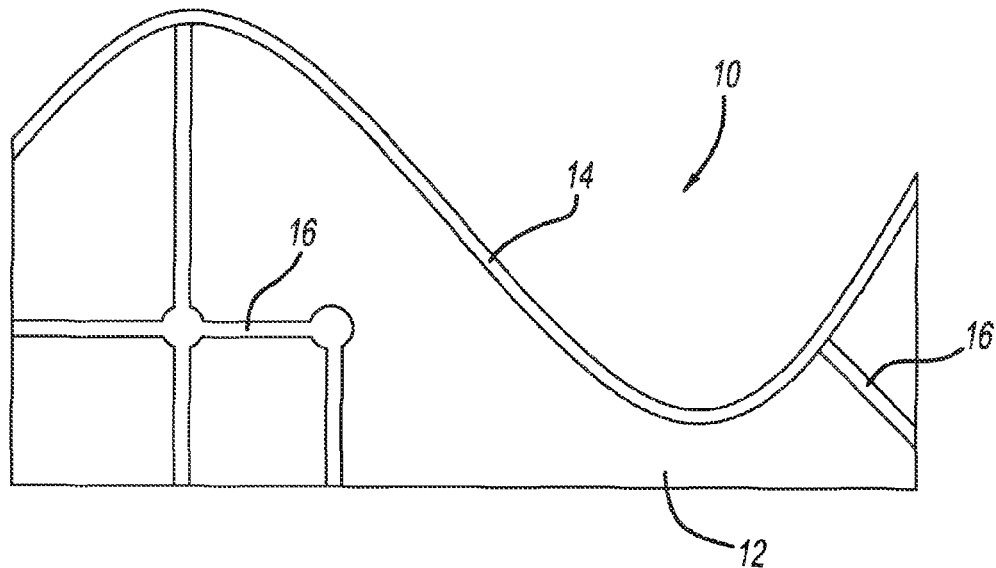
FIG. 1 is a simplified side view of a known injection mold including heating and cooling fluid channels.

FIG. 1 is a simplified side view illustration of a known injection mold 10 including a mass 12 of metal and a working surface layer 14. The mold 10 may be only a mold half, where a second mold half (not shown) of a corresponding shape would conform to the working surface layer 14 to define a mold cavity in which the part is molded, as would be well understood by those skilled in the art. Alternatively, the part can be formed on the working surface layer 14 by applying suitable pressure thereto from, for example, water or air. A series of heating and cooling fluid channels 16 are drilled in the mold mass 12 that deliver heating and cooling fluid to the working surface layer 14. As discussed above, these types of known molds employ bulks of metal in which the heating and cooling channels 16 are drilled, and which heat the entire mass 12 of the mold 10 causing relatively high cycle times.

Figure 2:
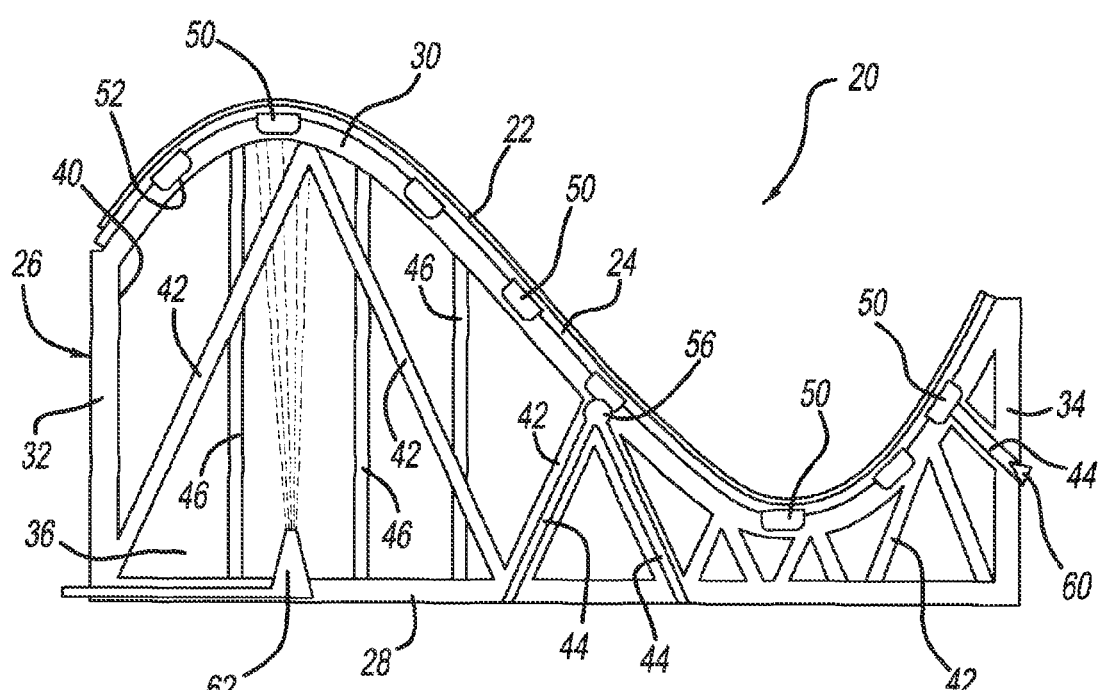
FIG. 2 is a simplified side view of an injection mold including a scaffolding structure.

FIG. 2 is a simplified side view of a mold 20 for forming the same part as the mold 10 in FIG. 1, but which is not a relatively solid piece of metal. The mold 20 includes a working surface layer 22 that is the shaped surface that will define the part when it is molded by the mold 20, where the working surface layer 22 can be a material that provides a good surface finish (e.g. nickel), provides wear resistance (e.g. tool steel) or some other desirable attribute. An intermediate heat transport layer 24 is provided beneath the working surface layer 22 and provides support for the working surface layer 22. The heat transport layer 24 is made of a material whose coefficient of thermal expansion is not significantly different from that of an upper member (upper member 30 below) or the working surface layer 22. The layer 24 also has better thermal transport properties (e.g. thermal conductivity and thermal diffusivity) than either of the other two layers. As an example, if the base layer is made of steel and the working surface layer 22 is made of nickel, the heat transport layer 24 may be made of a copper alloy. All of these materials have a thermal conductivity on the order of 20 e-6 m/m-K, but some Cu alloys have a thermal conductivity that can be up to a factor of 5 higher. Other candidate materials for this scenario include beryllium and gold.

Instead of providing the bulk mass metal as in the traditional and conventional injection mold, the present invention proposes employing a scaffolding structure 26 defining an enclosure 40 having a significant open area. Although an enclosure is described in this embodiment, other embodiments may employ a scaffolding structure that is open to provide natural convective cooling or heating. The structure 26 includes a continuous base member 28, a continuous upper member 30, and optional continuous side members 32, 34, 36 and 38 that extend around the mold 20, where the combination of the base member 28, the upper member 30 and side members 32, 34, 36 and 38 define the enclosure 40 of the scaffolding structure 26. Although the enclosure 40 is shown here as having a square configuration, this is by way of a non-limiting example in that the configuration of the scaffolding structure 26 defining the enclosure 40 can be any suitable shape for a particular molded part.

Figure 3:
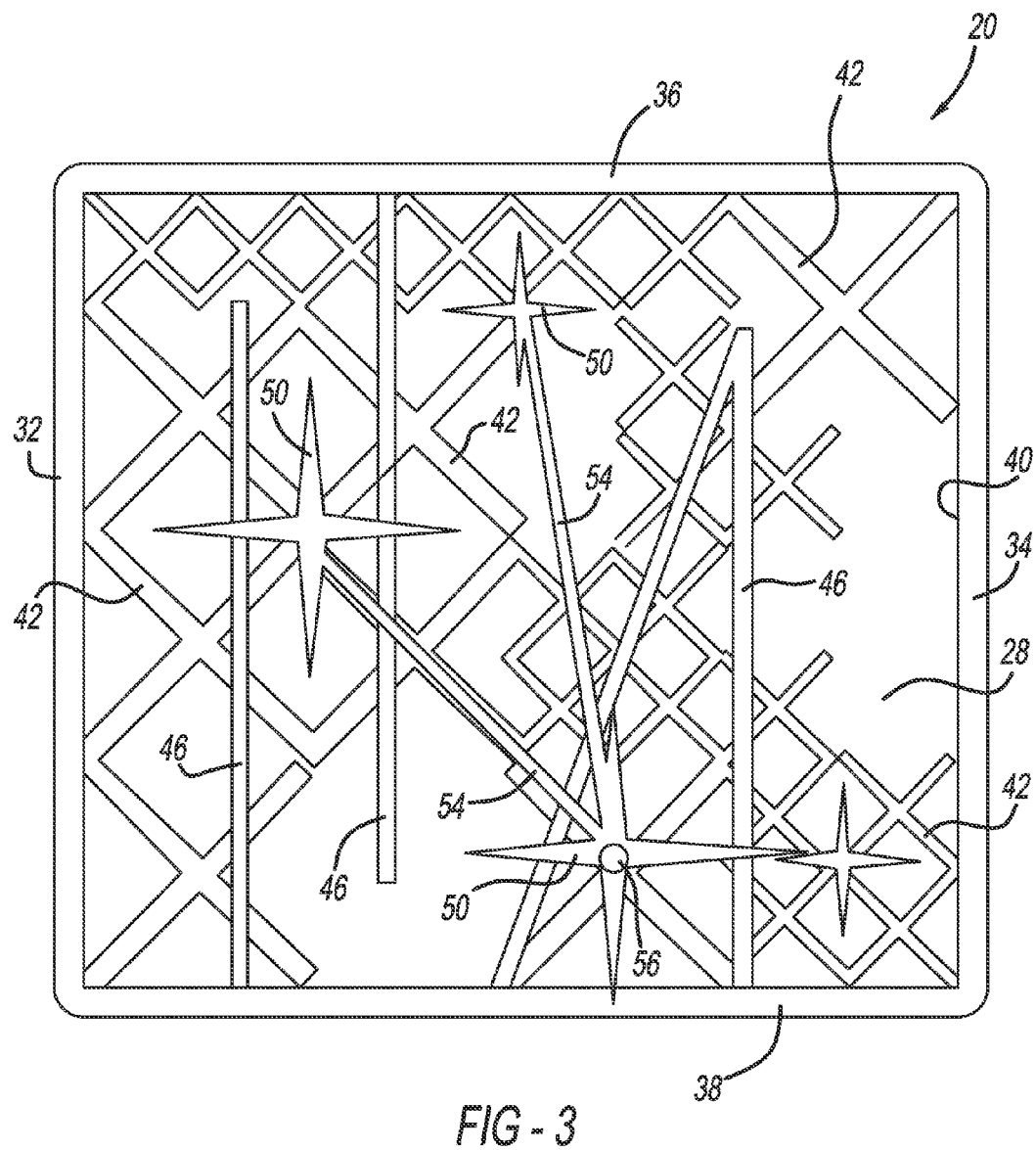
FIG. 3 is a top view of the mold shown in FIG. 2 with the working surface removed.

FIG. 3 is a top view of the mold 20 where the working surface layer 22 and the upper member 30 are removed to expose the heat transport layer 24 and the scaffolding structure 26 below. The scaffolding structure 26 also includes a network of angled and strategically positioned support members 42 that extend between the upper member 30 and the base member 28, or the upper member 30 and one of the side members 32, 34, 36 and 38. As is apparent, the support members 42 have various sizes, configurations and locations to provide the desired structural integrity to the working surface layer 22 necessary for a particular part. The present invention proposes any suitable configuration and orientation of the support members 42 for a particular application. For example, at the left side of the mold 20 where the load carried by the mold 20 is the greatest, a more robust configuration of the scaffold support members 42 may be necessary and at a right side of the mold 20 where the load carried by the mold 20 is small, fewer of the support members 42 are required. The number, geometry (orientation and dimensions) and distribution of the support members may be determined by choosing from a family of cellular primitives (e.g. a tetrahedron) which may be arranged in a single layer as shown in FIGS. 2 and 3 or stacked in multiple layers. Alternatively, the support members 42 may be determined by optimization based distribution of material. In either case, the objective is to design the support structure that provides the desired structural integrity for the mold 20 to ensure proper fabrication of the part and the desired mold life while reducing the mold mass and the time required to heat or cool the part during molding.

The configuration of the mold 20 discussed above defines an array of angled support members 42 that includes mostly open space within the enclosure 40 defined by the base member 28 and the side members 32, 34, 36 and 38. This open space allows a large amount of heating fluid or cooling fluid to be quickly and efficiently put into and removed from the open area to provide quick heating and cooling of the working surface layer 22. Further, such a large open area allows easy flow of the heating and cooling fluid, which causes even heating and cooling of the entire working surface layer 22. Heating and cooling fluid channels 44 can be provided in some of the support members 42 at the desired location, as shown, to provide additional or more localized heating and cooling of particular areas of the layer 22. Further, flow partitions or baffles 46 can be strategically provided within the enclosure 40 to guide the flow of the heating and cooling fluid through the enclosure 40 in a desirable manner.

Figure 5:
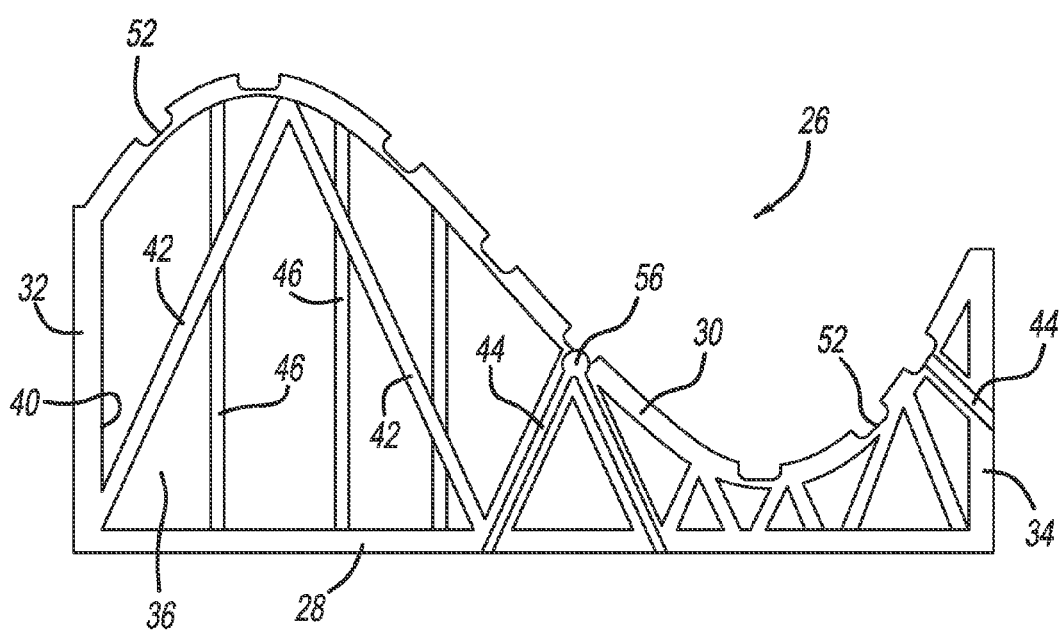
FIG. 5 is a side view of the mold scaffolding produced from the support sand and wax shown in FIG. 4.

To further enhance the heating and cooling at certain areas of the layer 22, the mold 20 includes specially configured and shaped heat spreading pads 50 made of a material with good thermal transport properties (e.g. thermal conductivity and thermal diffusivity). These may be positioned within recesses 52 in the upper member 30 as shown in FIGS. 2 and 5 or be deposited on top of the upper member 30. The heat spreading pads 50 have a particular configuration depending on how the heat needs to be dispersed. The recesses 52 are provided through a top surface of the upper member 30 so that the heat spreading pads 50 can be inserted therein and not affect the position of the intermediate layer 24. In one embodiment, heat transfer bars 54 connect two or more separated heat spreading pads 50 so as to allow the heat to be further dispersed to the desired location. One of the heat spreading pads 50 is in direct thermal contact with a coolant circuit node 56 to provide localized heating and cooling. In this non-limiting example, the heat spreading pads 50 are formed in the shape of stars to spread out the heat at certain areas. It is noted that the present invention contemplates any suitable configuration, thickness, material, etc. of a heat spreading material for this purpose. The number, shape, thickness and connectivity of the heat spreading pads 50 may be determined iteratively using thermal analysis of the molding process or may be determined using an optimization procedure such as one that minimizes the maximum temperature difference over a given region of the mold 20 while ensuring that the maximum stress in the mold material stays below a specified value. Further, it may be desirable to provide localized heating or cooling areas adjacent to the working surface layer 22 in other ways. For example, a heating/cooling fluid conduit 60 can be integrated into one or more of the support members 44 at any suitable location to convey the heating and/or cooling fluid directly to a particular heat spreading pad 50 or a part of the upper member 30. Additionally, a nozzle 62 can be provided within the enclosure 40 to spray a heating or cooling fluid directly on a specific location of the upper member 30 to provide a higher heating or cooling flux at some locations.

The scaffolding structure 26 discussed above can be made by any suitable process to define the desired configuration of the base member 28, the upper member 30, the side members 32, 34, 36 and 38, the support members 42, the heating and cooling fluid channels 44, the baffles 46, and the recesses 52 for the heat spreading pads 50 as a single unit. In one non-limiting example, the scaffolding structure 26 is formed by first defining a wax investment casting pattern produced by a rapid prototyping machine in a support structure, such as molding sand. The particular rapid prototyping machine lays down layers of wax and sand as it is being build up to the shape of the scaffolding structure 26.

Figure 4:
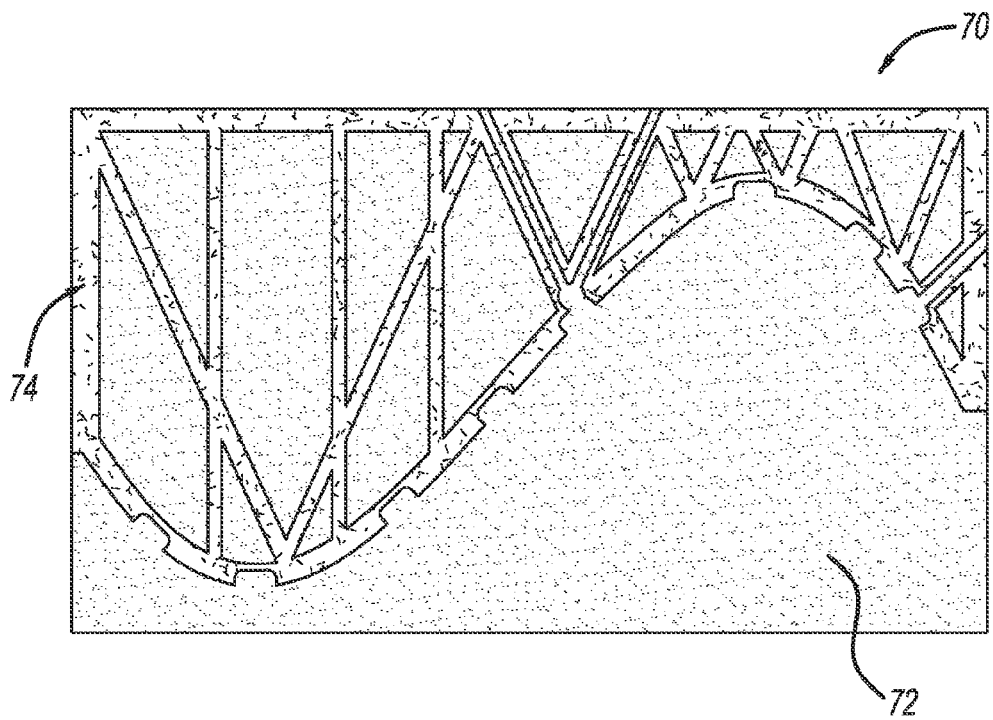
FIG. 4 is an illustration of part of a process for making the scaffolding for a mold that employs support sand and wax.

FIG. 4 is a simplified side view illustration of a wax investment casting 70 that has been formed by such a process, where the shape of the scaffolding structure 26 is defined in a sand mold 72 as a configuration of wax 74. The scaffolding structure 26 is formed by pouring molten metal into the sand mold 72 so that it melts the wax 74, where the wax 74 flows away and the cavity left within the molding sand 72 is then filled with the molten metal, which is then hardened to define the scaffolding structure 26. Such a molding process is well understood by those skilled in the art.

FIG. 5 is a side view of the scaffolding structure 26 after the molten metal has hardened and the sand mold 72 has been removed. Next, the heat spreading pads 50 are placed in the recesses 52 and the intermediate support layer 24 is deposited on the upper member 30 by, for example, chemical vapor deposition (CVD), electro-deposition, direct metal deposition, etc., to provide a wear resistant layer. Next, the surface layer 22 is deposited on the support layer 24 to provide the finish layer that defines the surface of the molded part. The entire mold 20 may be built up using a rapid prototyping technique, such as direct laser sintering, that can construct three dimensional metallic objects using different materials for different parts of the objects such as the scaffolding structure 26, the heat spreader pads 50, and the working surface layer 22 in this case.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A mold comprising:
a scaffolding support structure including a base member, a top member, and a plurality of angled support members interspersed between the base member and the top member so as to define open space for a heating or cooling fluid;
a working surface layer positioned on the top member;
an intermediate layer formed on the top member and beneath the working surface layer, where the intermediate layer includes heat spreading pads provided between the top member and the working surface layer, and at least one of the heat spreading pads has a two-dimensional star shape when viewed normal to the working surface layer; and
at least one heat transfer bar interconnecting at least two of the heat spreading pads.

2. The mold according to claim 1 wherein the scaffolding support structure is a single unit formed of metal.

3. The mold according to claim 1 wherein the scaffolding structure further includes a plurality of partitions defining fluid flow paths.

4. The mold according to claim 1 wherein at least some of the support members have channels providing heating and cooling fluid flow.

5. The mold according to claim 1 further comprising a heating and cooling spray nozzle integrated within or among the support members.

6. The mold according to claim 1 wherein the heat spreading pads are formed in recesses in the top member.

7. The mold according to claim 1 wherein the heat spreading pads are formed on top of the top member.

8. The mold according to claim 1 wherein the spatial distribution, geometry, orientation, and cross-sectional dimensions of the support members are chosen to meet structural and thermal performance requirements of the mold.

9. The mold according to claim 1 wherein the scaffolding support structure includes side members, and wherein the base member, the top member and the side members define an enclosure.

10. The mold according to claim 1 wherein the mold is an injection mold for a vehicle part.

11. A mold comprising:
a scaffolding support structure including a base member, a top member and side members defining an enclosure, said scaffolding structure further including a plurality of support members interspersed within the enclosure between the base member and the top member so as to define an open space within the enclosure, said scaffolding structure further including a plurality of flow partitions within the enclosure, wherein the base member, the top member, the side members, the support members and the partitions are a single unit;
an intermediate layer formed on the top member;
a working surface layer formed on the intermediate layer;
two or more heat spreading pads formed in the top member and contacting the intermediate layer, where at least one of the heat spreading pads has a two-dimensional star shape when viewed normal to the working surface layer, and at least one of the heat spreading pads is in direct thermal contact with a cooling circuit node in the scaffolding structure; and
at least one heat transfer bar interconnecting at least two of the heat spreading pads.

12. The mold according to claim 11 wherein at least some of the support members have channels that allow heating and cooling fluid flow.

13. The mold according to claim 11 further comprising a heating and cooling spray nozzle integrated within or among the support members.

14. The mold according to claim 11 wherein the scaffolding support structure is a single unit formed of metal.

15. A mold for molding a vehicle part, said mold comprising:
a scaffolding support structure including a base member, a top member and side members defining an enclosure, said scaffolding structure further including a plurality of support members interspersed within the enclosure between the base member and the top member so as to define open space within the enclosure, said scaffolding structure further including a plurality of flow partitions within the enclosure, wherein the base member, the top member, the side members, the support members and the partitions are a single unit, wherein at least some of the support members have channels that allow heating and cooling fluid flow, and wherein the spatial distribution, geometry, orientation and cross-section dimensions of the support members are chosen to meet structural and thermal performance requirements of the mold;
a plurality of heat spreading pads formed in recesses in the top layer and interconnected by heat transfer bars, where at least one of the heat spreading pads has a two-dimensional star shape when viewed normal to the working surface layer, and at least one of the heat spreading pads is in direct thermal contact with a cooling circuit node in the scaffolding structure;
a heating and cooling spray nozzle integrated within or among the support members;
an intermediate layer formed on the top member; and
a working surface layer formed on the intermediate layer.

* * * * *